US006389169B1

(12) United States Patent
Stark et al.

(10) Patent No.: US 6,389,169 B1
(45) Date of Patent: May 14, 2002

(54) INTELLIGENT SYSTEMS AND METHODS FOR PROCESSING IMAGE DATA BASED UPON ANTICIPATED REGIONS OF VISUAL INTEREST

(76) Inventors: Lawrence W. Stark, 9 W. Parnassus Ct., Berkeley, CA (US) 94708; Claudio M. Privitera, 2617 College Ave., Berkeley, CA (US) 94704

( * ) Notice: Subject to any disclaimer, the term of this patent is extended or adjusted under 35 U.S.C. 154(b) by 0 days.

(21) Appl. No.: 09/093,743

(22) Filed: Jun. 8, 1998

(51) Int. Cl.[7] .............................. G06K 9/62; G06K 9/46; G06K 9/36; G06F 15/00
(52) U.S. Cl. ........................ 382/225; 382/250; 382/278; 708/405
(58) Field of Search .................................. 382/225, 190, 382/195, 276, 278, 280, 128, 132, 250; 364/728.01, 728.02, 726.01, 726.02, 726.03; 708/403, 404, 405, 420, 421

(56) References Cited

U.S. PATENT DOCUMENTS

| | | | | |
|---|---|---|---|---|
| 5,133,020 A | * | 7/1992 | Giger et al. | 382/128 |
| 5,901,247 A | * | 5/1999 | Osbourn et al. | 382/225 |
| 5,953,460 A | * | 9/1999 | Wu | 382/239 |
| 5,987,094 A | * | 11/1999 | Clarke et al. | 382/128 |
| 5,999,639 A | * | 12/1999 | Rogers et al. | 382/132 |
| 6,011,862 A | * | 1/2000 | Doi et al. | 382/132 |
| 6,075,878 A | * | 6/2000 | Yoshida et al. | 382/132 |

OTHER PUBLICATIONS

Tianxu et al, "An Adaptive Image Segmentation Method with Visual Nonlinearity Characteristics"; IEEE Transaction on Systems, Man and Cybernetics; ISSN: 1083–4419, vol. 26, Issue 4, pp. 619–627, Aug. 1996.*
Stark et al, "Top–down and Bottom–up Image Processing"; IEEE Conference on Neural networks, ISBN: 0–7803–4122–8, vol. 4, pp. 2294–2299, Jun. 1997.*

* cited by examiner

Primary Examiner—Amelia M. Au
Assistant Examiner—Mehrdad Dastouri
(74) Attorney, Agent, or Firm—Lyon & Lyon LLP

(57) ABSTRACT

Systems and methods for performing intelligent image processing. Image processing systems and methods in accordance with the present invention may select algorithms for processing collections of images by comparing algorithmic region of interest (aROI) data to stored human visual region of interest (hROI) data to select from a database of available transformation algorithms an optimal algorithm or group of algorithms to be used in transforming data comprising the collection or collections of images. The selected algorithm(s) may then be used, for example, in data compression, image enhancement or database query functions.

8 Claims, 11 Drawing Sheets

Database of Mathematical Image Processing Transformation Functions

A- statistical kernels

N -- entropy is calculated within a surrounding of the center pixel

C -- Michaelson contrast generally considered to be an important choice feature for human vision.

O -- difference in the gray-level orientation, a statistical-type kernel, is analyzed in early
      visual cortex

B- structural kernels

X -- an x-like mask, positive along two diagonal and negative elsewhere, were convoluted with the image S -- symmetry transform, appears to be a very prominent spatial relation F -- center-surround on/off quasi-receptive field mask is convoluted with the image E -- concentration of edges per unit area H -- dct-JPEG analysis. The image is subdivided into square blocks and each block quantified by high frequency coefficients L   the Laplacian of the Gaussian is convoluted with the image

C- wavelet kernels

W -- discrete wavelet transform: for each resolution, only the detail coefficients were retained <u>SELECTING AN IMAGE PROCESSING TRANSFORMATION FUNCTION</u>

<u>PICKING</u> AN IMAGE PROCESSING TRANSFORMATION FUNCTION

*Fig. 7*

| Sp | X | S | W | F | algs |
|---|---|---|---|---|---|
| A | 0.6 | 0.67 | 0.72 | 0.64 | |
| C | 0.78 | 0.78 | 0.73 | 0.4 | |
| H | 0.52 | 0.60 | 0.40 | 0.51 | |
| T | 0.42 | 0.42 | 0.47 | 0.28 | |
| humans | 0.58 | 0.62 | 0.58 | 0.46 | |

Fig. 11

Fig. 12a
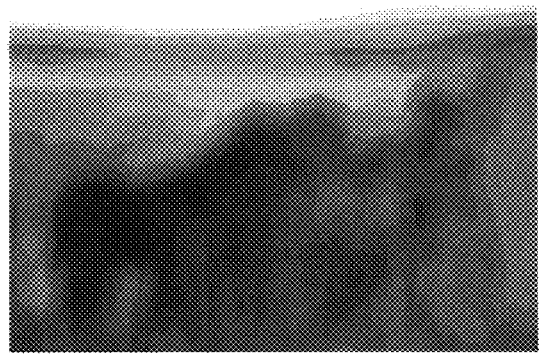
Fig. 12b
Fig. 12d
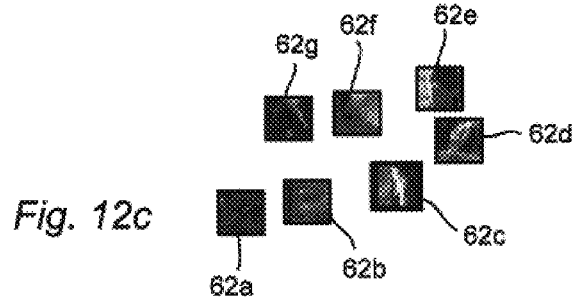
Fig. 12c

INTELLIGENT SYSTEMS AND METHODS FOR PROCESSING IMAGE DATA BASED UPON ANTICIPATED REGIONS OF VISUAL INTEREST

BACKGROUND

1. Field of the Invention

The present invention relates generally to image processing systems and, more particularly, to systems and methods for processing image data based upon predetermined regions of human visual interest.

2. Background of the Invention

The Scanpath Theory of human vision, proposed by Noton and Stark in 1971, suggests that a top-down, internal cognitive model of what a person sees when actively looking at an image guides active eye movements of the person and controls and/or influences the person's perception of the image being viewed. Stated somewhat differently, Noton and Stark suggest that eye movements utilized in visually examining an image are generated based at least in part upon an internal cognitive model that has been developed by a person through experience. The term "top down processing" as used herein denotes image processing that proceeds with some assumed knowledge regarding the type of image being viewed or image data being analyzed. Thus, the Scanpath Theory posits that when a person views an image, the eye movements of the person will follow a pattern that is premised upon knowledge of the type of image that is being viewed and/or similar types of images.

The Scanpath Theory recognizes that active eye movements comprise an essential part of visual perception, because these eye movements carry the fovea, a region of high visual acuity in the retina, into each part of an image to be processed. Thus, the Scanpath Theory posits that an internal cognitive model drives human eye movements in a repetitive, sequential set of saccades and fixations ("glances") over specific regions-of-interest ("ROIs") in a scene, with the subconscious aim of confirming the top-down, internal cognitive model—the "Mind's Eye", so to speak.

Experimental investigation of the Scanpath Theory has involved presenting a complex visual stimulus (such as a scenic photograph) to a human subject and recording the eye movements made by the subject while looking at the presented image. Thus, computer-controlled experiments present an image and carefully measure the subject's eye movements using video cameras. Eye movement recordings are then represented as sequences of alternating glances (saccades and fixations), where the duration of each glance generally lasts about 300 milliseconds. Every glance the subject makes while looking at the image enables the high resolution fovea of the retina to abstract information from the image during the fixation period, identifying a fixation point on the image as a visual region-of-interest, or ROI. This is shown, for example, in FIGS. 8a, 8b and 9.

Diametrically opposed to the Scanpath Theory, current methods for computerized image processing are usually intended to detect and localize specific features in a digital image in a "bottom-up" fashion, analyzing, for example, spatial frequency, texture conformation, or other informative values of loci of the visual stimulus. The term "bottom up processing" is used herein to denote processing methods that assume no knowledge of an image being viewed or image data being processed. Prior art methods that have been proposed in the literature can be classified into three principal approaches:

1. Structural Methods are based on an assumption that images have detectable and recognizable primitives, which are distributed according to some placement rules—examples of prior art methods that use such an approach are matched filters.
2. Statistical Methods are based on statistical characteristics of the texture of the picture—examples of prior art methods that use a statistical approach are Co-Occurrence Matrices and Entropy Functions.
3. Modeling Methods hypothesize underlying processes for generating local regions of visual interest—examples of prior art that use a modeling approach are Fractal Descriptors.

U.S. Pat. No. 5,535,013, entitled "Image Data Compression and Expansion Apparatus, and Image Area Discrimination Processing Apparatus Therefor," teaches a method of image data compression in which an image is first divided into square pixel blocks and then encoded using an orthogonal transform. This is a statistical method. The encoding process is based upon a discrete cosine transform, and is thus a JPEG algorithm. Using the coefficients of the discrete cosine transform, the method taught by U.S. Pat. No. 5,535,013 discriminates blocks containing text from blocks containing general, non-text dot images. Then; a selective quantization method is used to identify different quantization coefficients for text blocks and non-text blocks.

Other bottom-up methods of image processing suggest that characterization and decomposition of an image can be based upon primitives such as color, texture, or shape. Such methods can be more powerful than the text/non-text discrimination method of U.S. Pat. No. 5,535,013, but still cannot overcome the important limitation that for a general, complex image, regions of interest are difficult to specify by a single parameter such as color or shape. This is shown, for example, in U.S. Pat. No. 5,579,471, entitled "Image Query System and Method."

In view of the foregoing, it is submitted that those skilled in the art would find to be quite useful a method and apparatus for image processing which takes into account the underlying nature of human vision and perception, so as to selectively decompose an image into its most meaningful regions of visual interest, thereby providing a means for improving image compression, image query techniques and visual image enhancement systems.

SUMMARY OF THE INVENTION

In one particularly innovative aspect, the present invention is directed to systems and methods for image processing that utilize a cognitive model stored in memory to identify regions within an image that correlate with previously determined regions of visual interest for a given type of image or type of image data being processed.

In another innovative aspect, systems and methods in accordance with the present invention may select algorithms for processing collections of images by comparing algorithmic region of interest (aROI) data to stored human visual region of interest (hROI) data to select an optimal algorithm or group of algorithms to be used in transforming data comprising the collection or collections of images. The selected algorithms may then be used, for example, in data compression, image enhancement or database query functions.

In still another innovative aspect, the present invention is directed to systems and methods that utilize conventional image processing algorithms in combination with innovative clustering, sequencing, comparing and parsing techniques to predict loci of human fixations within an image or within collections of images for the purposes of, for example, data compression, image enhancement and image database query functions. Indeed, empirical analysis reveals that systems and method in accordance with the present invention enable a prediction of human fixation loci that is comparable in measure to the ability of one human to predict the loci of eye movements of other persons viewing an image.

In still another innovative aspect, systems and methods in accordance with the present invention may detect regions of visual interest (ROIs) within an image based upon stored characteristic data representative of human visual perception. For example, using the method(s) of the present invention, algorithmic regions of interest (aROIs) having a high, or relatively high, correlation with human regions of visual interests (hROIs) may be developed for an image or collection of images, and thereafter an image or collection of images may be saved within a system using selected portions of the original picture (i.e., aROIs) as identification data. Then, the selected portions of the picture (i.e., saved aROI data) may be used in performing a query search. The query search may proceed, for example, by comparing saved aROIs in a database with ROIs specified by the system operator. Processing image data in this fashion should provide for substantial reductions in image processing time. Further, it will be appreciated that, through the use of processing algorithms and methodologies in accordance with the present invention, it is possible to take into consideration more complex features of an image, not just indications of color, shape and the like.

A system for compressing and processing collections of images in accordance with one form of the present invention may comprise, for example, means for transforming image data representative of a particular image, collection of images or type of image into a domain of "visual relevance", for example, using a database of image processing transformation functions; means for obtaining a set of algorithmic regions of interest (aROIs) from a transformed image, for example, by thresholding; means for clustering local maxima from the transformed image into a second set of only a few, very relevant algorithmic regions of interest (aROIs), such that the most relevant algorithmic regions of interest (aROIs) are properly distributed over the image; means for comparing the identified algorithmic regions of interest (aROIs) with predetermined human visual regions of interest (hROIs) to select an optimal image processing transformation function; and means for using the selected optimal image processing transformation function to compress the remainder of images with a collection or collections of images. In addition, a system in accordance with the present invention may comprise means for using the algorithmic regions of interest (aROIs) to implement image query functions and/or means for using the algorithmic region of interest (aROI) data to implement various visual image enhancement techniques.

It will be appreciated that systems and methods in accordance with the present invention can be utilized to process very large collections of data including, for example, large collections of pictures, scenes and works of art. It also will be appreciated that systems and methods in accordance with the present invention may be utilized, for example, to compress, search and/or enhance images ranging from natural and constructed landscapes and "cityscapes", to groups of persons and animals and objects, and to single portraits and still lives.

Accordingly, it is an object of the present invention to provide improved systems and methods for use in the field of image processing.

It is also an object of the present invention to provide systems and methods the utilize top down image processing techniques to improve image processing functions and efficiency.

Other objects and features of the present invention will become apparent from consideration of the following description taken in conjunction with the accompanying drawings.

BRIEF DESCRIPTION OF THE DRAWINGS

FIG. 7 comprises a representation of mathematical image processing transformation functions, grouped by category, that may be used in image processing systems.

FIG. 11 comprises a table showing a correlation between regions of interest identified by various transformation algorithms and regions of interest obtained through monitoring the eye movement of various human subjects.

FIGS. 12a–d show how anticipated human visual regions of interest (hROIs) may be used within image compression techniques.

DETAILED DESCRIPTION OF PREFERRED EMBODIMENTS

Turning now to the drawings, before addressing the various image processing techniques that are utilized in accordance with the present invention, it will be noted that the methods described and claimed herein may be implemented or, stated differently, executed on any of a number of computer systems. For example, the image processing protocols described herein may be implemented within applications designed to run on either personal computer (PC), Unix work stations, dedicated hardware or, indeed, within virtually any other environment. Thus, the specific hardware used to implement the systems and methods described below will not be described in detail herein. Rather, it will be understood that the systems and methods may be implemented using virtually any computing system and that a typical PC including a 200 MHz or better Pentium® processor manufactured by the Intel Corporation and related components would be exemplary.

Figure 1:
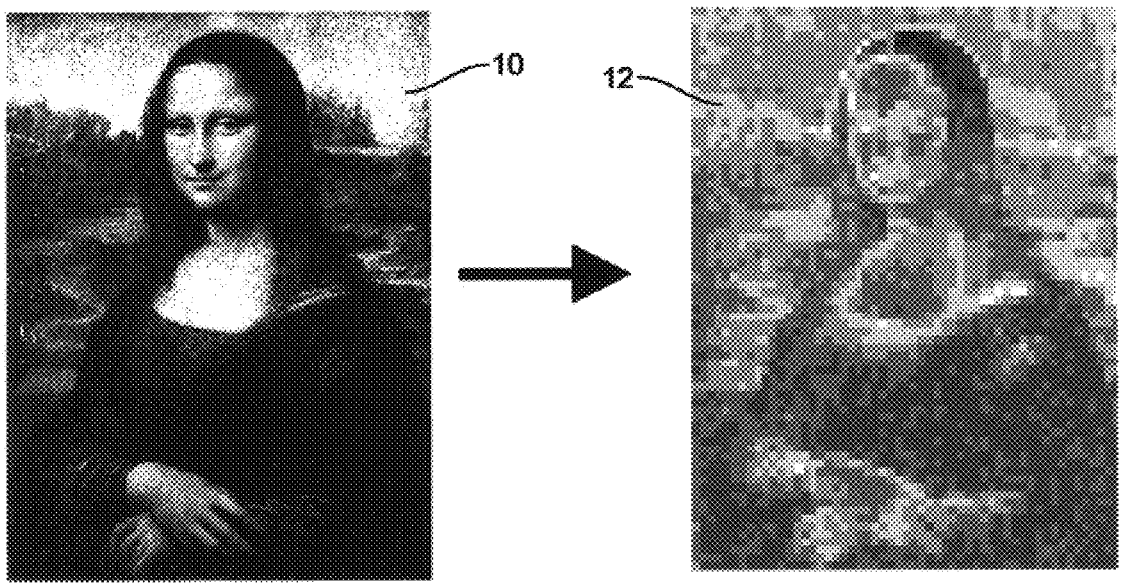
FIG. 1 is an illustration of an image of the Mona Lisa and a transformation of that image.
Figure 2:
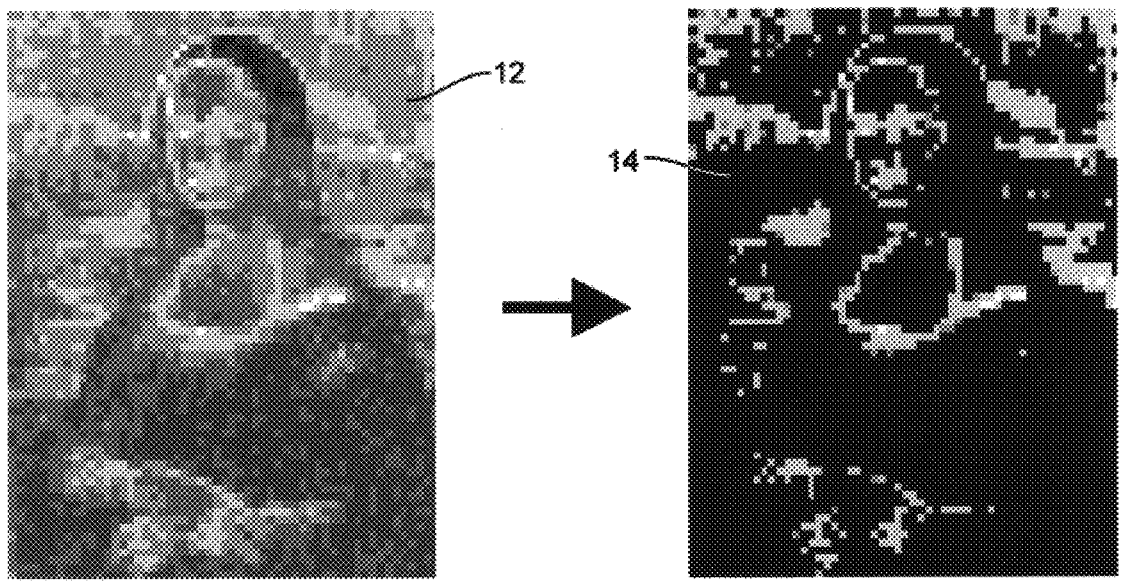
FIG. 2 shows how a thresholding algorithm may be applied to the transformed image of FIG. 1 to produce image local maxima data.

Turning to FIG. 1, those skilled in the art will appreciate that, using conventional transformation functions, it is possible to convert an original image 10 to a transformed image 12. Similarly, it is possible to apply thresholding criteria to the transformed image 12 to obtain a mapping 14 comprising a plurality of maxima loci within the transformed image. This is shown, for example, in FIG. 2.

The information content of a generic picture can be identified by different image parameters which in turn can be identified by relevant image processing algorithms. In this sense, applying algorithms to a picture means to map that image into different domains, where for each domain a specific set of parameters is extracted. After the image has been processed, only the loci of the local maxima from each domain are retained; these maxima are then clustered in order to yield a limited number of ROIs. Exemplary algorithms that have been studied include:

1—X, a x-like mask, positive along two diagonal and negative elsewhere, were convolved with the image. We have also used different high-curvature masks convolution as for example the "<"-like mask whose the definition is intuitive: these were rotationally invariant.

2—S, symmetry, a structural approach, appears to be a very prominent spatial relation. For each pixel, x, y of the image, we define a local symmetry magnitude S(x,y) as follows:

$$S(x, y) = \sum_{(i_1, j_1),(i_2, j_2) \in \Gamma(x,y)} s((i_1, j_1), (i_2, j_2))$$

where $\Gamma(x,y)$ is the neighborhood of radius 7 of point x,y defined along the horizontal and vertical axis ($\Gamma(x,y)=(x-r, y), \ldots, (x,y), \ldots (x,y-r), \ldots, (x,y+r)$) and $s((i_1,j_1),(i_2,j_2))$ is defined by the following equation:

$$s((i_1,j_1),(i_2,j_2))=G\sigma(d((i_1,j_1),(i_2,j_2))) |\cos(\theta_1-\theta_2)|$$

The first factor $G\sigma$ is a guassian of fixed variance, $\sigma=3$ pixels and $d(\bullet)$ represents the distance function. The second factor represents a simplified notion of symmetry: $\theta_1$ and $\theta_2$ correspond to the angles of the gray level intensity gradient of the two pixels $(i_1,j_1)$ and $(i_2,j_2)$. The factor achieves the maximum value when the gradients of the two points are oriented in the same direction. The guassian represents a distance weight function which introduces localization in the symmetry evaluation.

3—W, discrete wavelet transform is based on a pyramidal algorithm which split the image spectrum into four spatial frequency bands containing horizontal lows/vertical lows (ll), horizontal lows/vertical highs (lh), horizontal highs/vertical lows (hl) and horizontal highs/vertical highs (hh). The procedure is repeatedly applied to each resulting low frequency band resulting in a multiresolution decomposition into octave bands. The process of the image wavelet decomposition is achieved using pair of conjugate quadrature filters (CPFs) which acts as a smoothing filter (i.e. a moving average) and a detailing filter respectively. We have used different orders from the Daubechies family basis to define CPF filters. For each resolution I, only the wavelet coefficients of the highs/highs $hh_I$ matrix were retained and finally relocated into an final matrix HH (with the same dimension as the original image) by the following combination:

$$HH = \sum_{i=1}^{n} \zeta^i(hh_i)$$

Where n is the maximum depth of the pyramidal algorithm (n=3 in our case) and where $\zeta(\bullet)$ is a matrix operation which returns a copy of the input matrix hh by inserting alternatively rows and columns of zeros.

4—F, a center-surround on/off quasi-receptive field mask, positive in the center and negative in the periphery, is convolved with the image.

5—o, difference in the gray-level orientation, a statistical-type kernel, is analyzed in early visual cortices. Center-surround difference is determined first convolving the image with four gabor masks of angles 0°, 45°, 90° and 135° respectively. For each pixels x, y, the scalar result of the four convolutions are then associated with four unit vectors corresponding to the four different orientations. The orientation vector $\vec{o}(x,y)$ is represented by the vectorial sum of these four weighted unit vectors. We define the center-surround difference transform as follows:

$$O(x,y)=(1-\vec{o}(x,y)\cdot\vec{m}(x,y))\|\vec{o}(x,y)\|\|\vec{m}(x,y)\|$$

where $\vec{m}(x,y)$ is the average orientation vector evaluated within the neighborhood of 7×7 pixels. The first factor of the equation achieves high values for big differences in orientation between the center pixel and the surroundings. The second factor acts as a low-pass filter for the orientation feature.

6—E, concentration of edges per unit area is determined by detecting edges in an image, using the canny operator [2] and then congregating the edges detected with a gaussian of $\sigma=3$ pixels.

7—N, entropy is calculated as $$\sum_{i=0}^{255}$$

$p_I \log p_I$ where $p_I$ is the probability of the gray level I within the 7×7 surrounding of the center pixel.

8—C, Michaelson contrast, is most useful in identifying high contrast elements, generally considered to be an important choice feature for human vision. Michaelson contrast is calculated as $\|(L_m-L_M)/(L_m+L_M)\|$ where $L_m$ is the mean luminance within a 7×7 surrounding of the center pixel and $L_M$ is the overall mean luminance of the image.

9—H, discrete cosine transform, DCT, introduced by, is used in several coding standards as, for example, in the JPEG-DCT compression algorithm. The image is first subdivided into square blocks (i.e. 8×8); each block is then transformed into a new set of coefficients using the DCT; finally, only the high frequency coefficients, the ones that are instead discarded in the JPEG algorithm, are retained to quantify the corresponding block.

Figure 3:
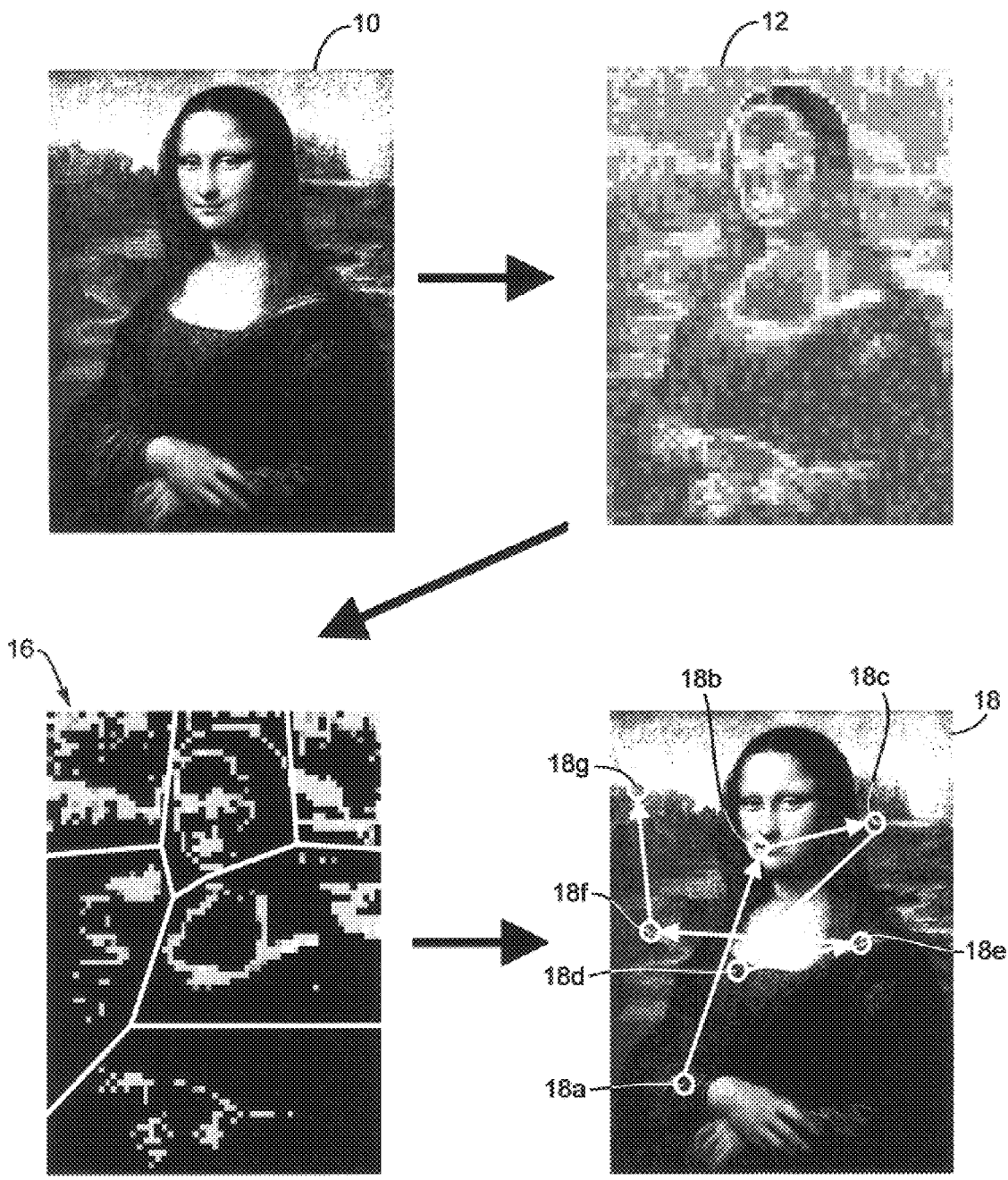
FIG. 3 shows how an original image may be transformed, how local maxima may be identified within the transformed image, how the local maxima may be clustered and, finally, how any resulting clusters may be quantified based upon local maxima data.

Turning now to FIG. 3, if desired, it is possible to convert an original image 10 to a transformed image 12, to process the transformed image 12 to obtain a mapping 16 of maxima loci that are grouped by cluster and, finally, to quantify the value of the local maxima within the clusters to obtain quantified data indicative of algorithmic regions of interest (aROIs) 18a–g within the original image 10.

Figure 4:
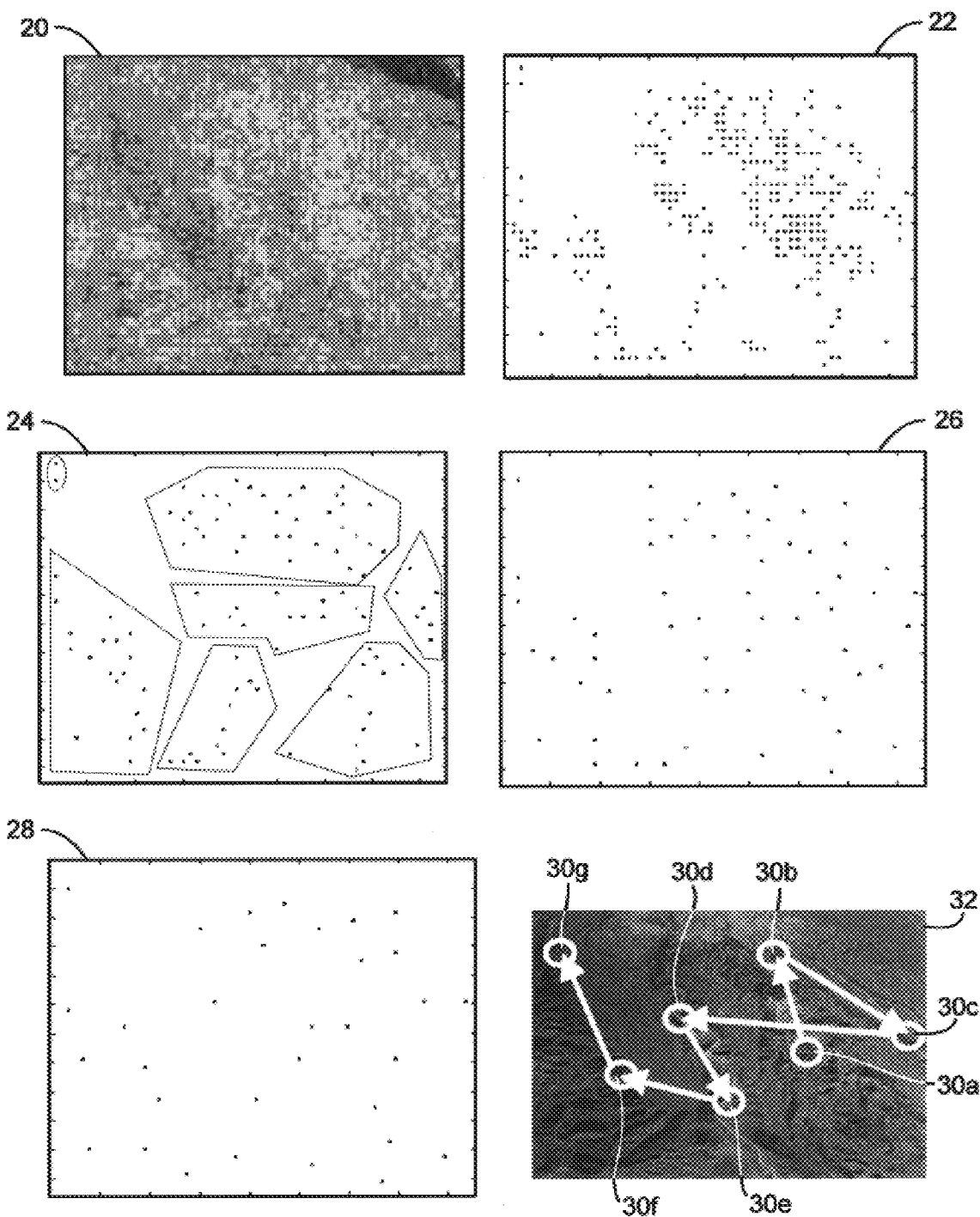
FIG. 4 shows how a transformed image may be processed to obtain local maxima, how the local maxima may be iteratively clustered, and how regions of interest may be identified based upon quantified cluster data.

FIG. 4 shows how a transformed image 20 may be processed to obtain a mapping 22 of local maxima, and how clustering algorithms may be applied in an iterative fashion to the mapping 22 of local maxima to develop, for example, iterative clusters 24–28 of local maxima and to identify a plurality of algorithmic regions of interest (aROIs) 30a–g within an original image 32.

A clustering procedure in accordance with the present invention may proceed as follows. The initial set of local maxima is clustered connecting local maxima by gradually increasing an acceptance radius for their joining. In preferred embodiment, approximately 100 initial local maxima may be reduced, for example, to nine regions or clusters by setting a termination decision to end the clustering process at the prescribed number of domains. Then, the clustered domains can be assigned values depending upon the value of the highest local maxima incorporated into that domain or, alternatively, based on the number of local maxima included within a cluster. Those skilled in the art will appreciate that other criteria may also be utilized.

It will also be appreciated that each image processing algorithm contributes to the intensity of its selected parameter to find local maxima and values of resulting clustered ROI domains. Moreover, the clustering algorithm may comprise an eccentricity weighting algorithm, where lower local maxima that are eccentrically located can be selected to form a domain.

Figure 5:
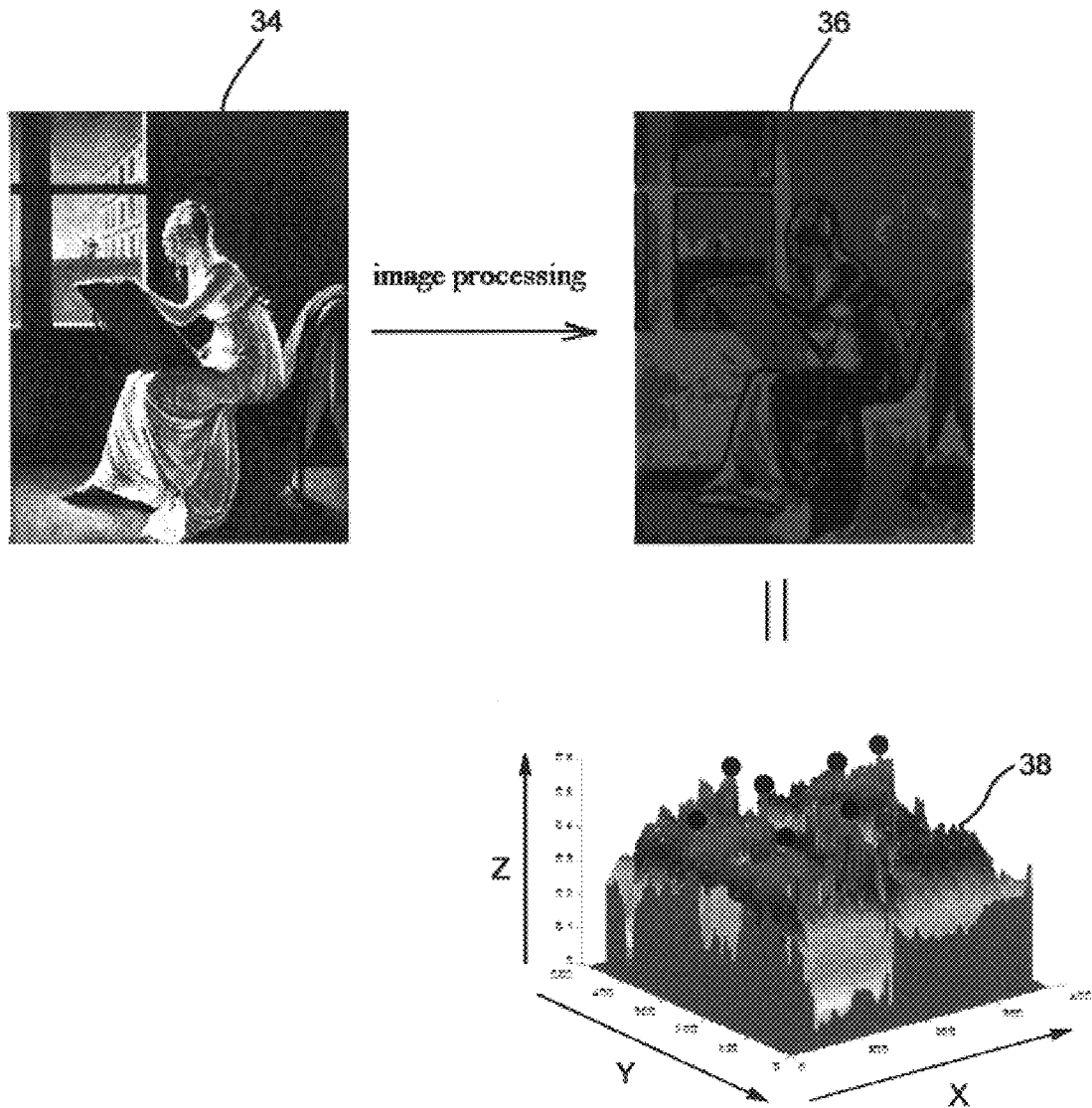
FIG. 5 shows how an image may be transformed and represented by a 3-dimensional pixel intensity diagram, and how quantified cluster data may be represented within the 3-dimensional pixel intensity diagram.

Turning to FIG. 5, those skilled in the art will appreciate that a transformation function may be applied to an original image 34 to convert the original image to a transformed image 36 and how, thereafter, a 3-dimensional pixel intensity diagram 38 may be developed from the transformed image 36. The 3-dimensional pixel intensity diagram 38 provides location data along the x and y axes of the graph and pixel intensity values along the z axis of the graph. Thus, the height of the 3-dimensional pixel intensity diagram 38 at a particular x,y pixel location may represent the pixel intensity or local maxima value at that location. FIG. 5 also provides an illustration of a plurality of final cluster locations 40a–g defined within the 3-dimensional pixel intensity diagram 38.

Figure 6:
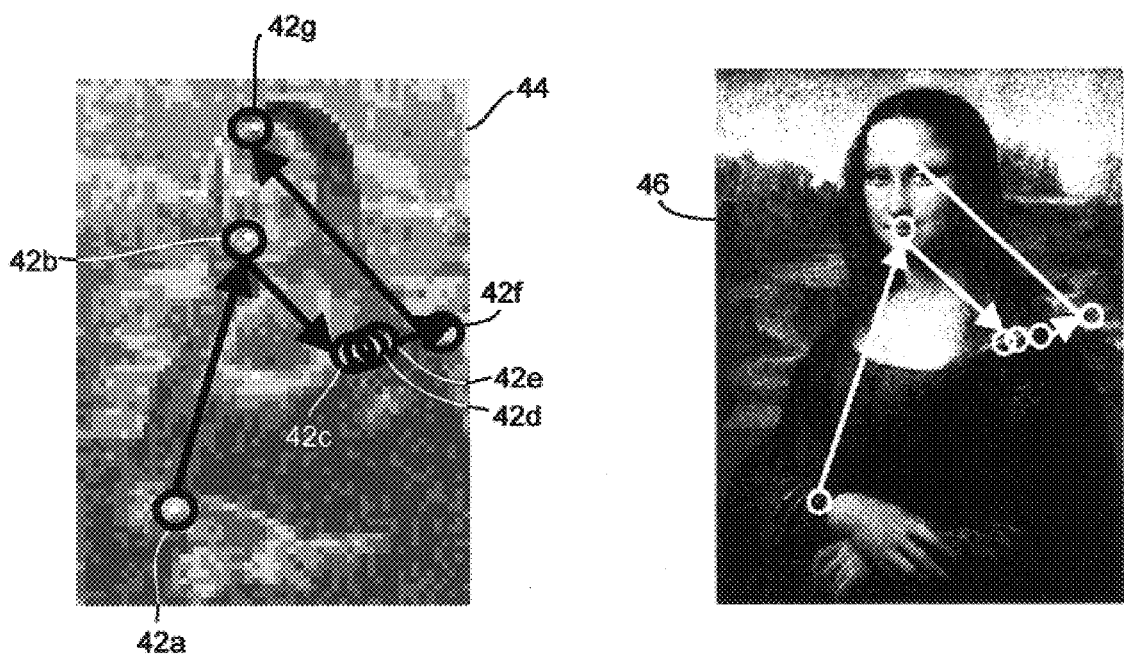
FIG. 6 shows how an image may be transformed and local maxima obtained without the utilization of a clustering algorithm.

Turning now to FIG. 6, that figure shows how a limited number of local maxima 42a–g may be identified within a transformed image 44 and may be mapped onto an original image 46. It will be appreciated that, in view of FIG. 6, that when iterative clustering protocols are not applied to transformed image data, less optimally distributed algorithmic regions of interest (aROIs) 42a–g are identified. Stated somewhat differently, where iterative clustering techniques are not applied to transformed image data, less relevant algorithmic regions of interest (aROIs) 42a–g are identified.

Turning now to FIG. 7, those skilled in the art will appreciate that numerous image processing transformation functions may be used in accordance with the present invention to identify algorithmic regions of interest (aROIs) within an image. Several such algorithms may comprise a database represented by FIG. 7, and in the example provided an entropy algorithm is used. It will be appreciated that an entropy transformation algorithm was used to process the image 10 provided in FIG. 1.

Figure 8A:
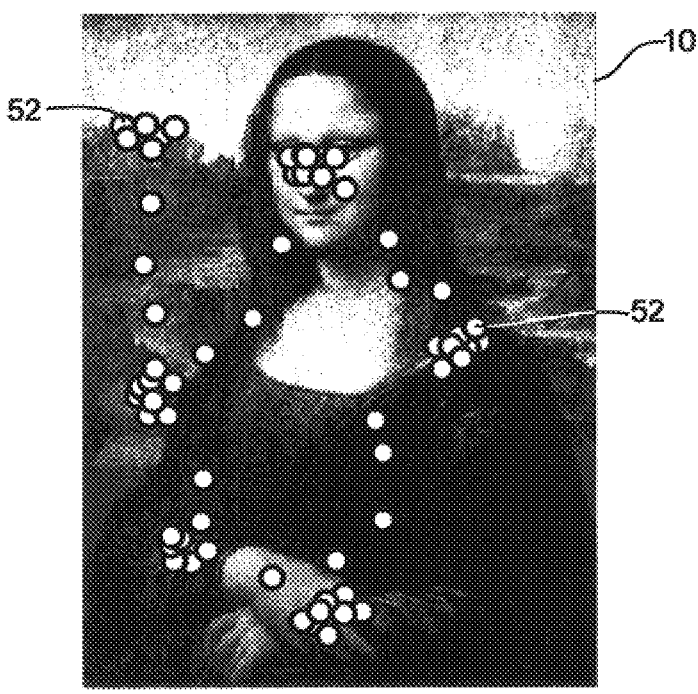
FIG. 8a and 8b illustrate how human eye movement may be utilized to identify human visual regions of interest (HROI) within an image.
Figure 8B:
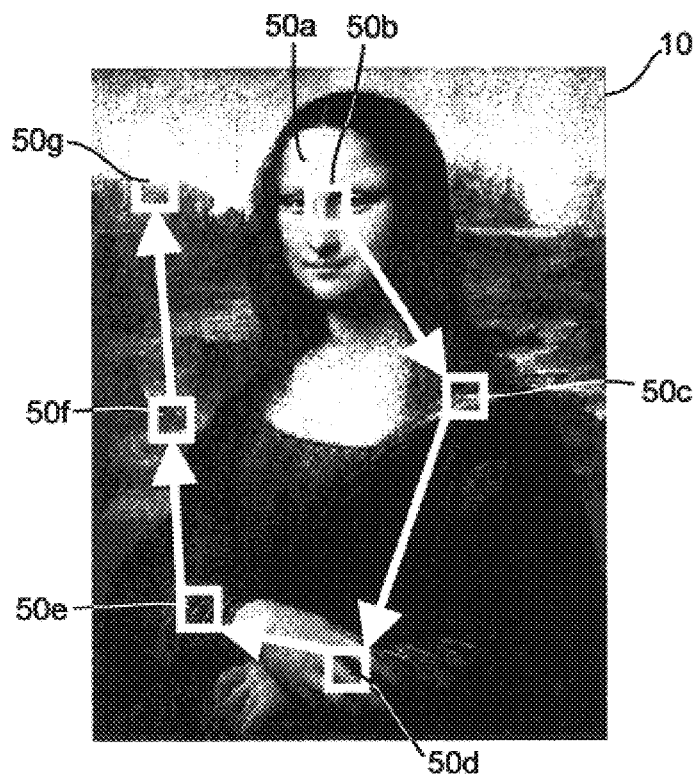

Now, turning to FIGS. 8a and 8b, those figures illustrate how, by mapping human eye movements, human visual regions of interest (hROIs) 50a–g may be identified within an image. More specifically, FIG. 8a shows how human fixation loci 52 may be developed as a person observes an image. It will be noted that the human fixation loci 52 illustrated in FIG. 8a are developed by monitoring the amount of time that the human eye focuses on particular loci within the image. Turning now to FIG. 8b, it will be seen that, by tracking human eye movements to identify the human fixation loci 52, and by applying fixation identification procedures to those loci 52, it is possible to identify human visual regions of interest (hROIs) within the image 10.

Figure 9:
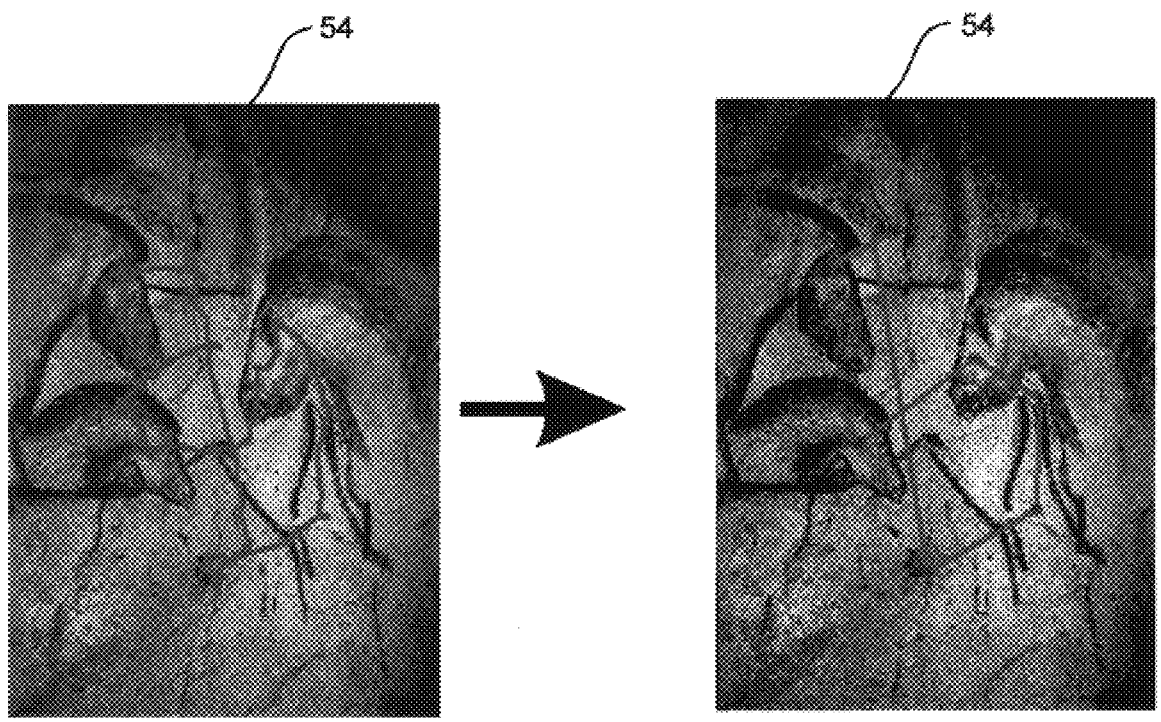
FIG. 9 provides a second illustration of how human eye movement may be utilized to identify human visual regions of interest (hROI) within an image.

FIG. 9 shows how raw data, on the left, indicative of human eye movement may be parsed to identify human regions of visual interest (hROIs), on the right, within an image 54.

Figure 10:
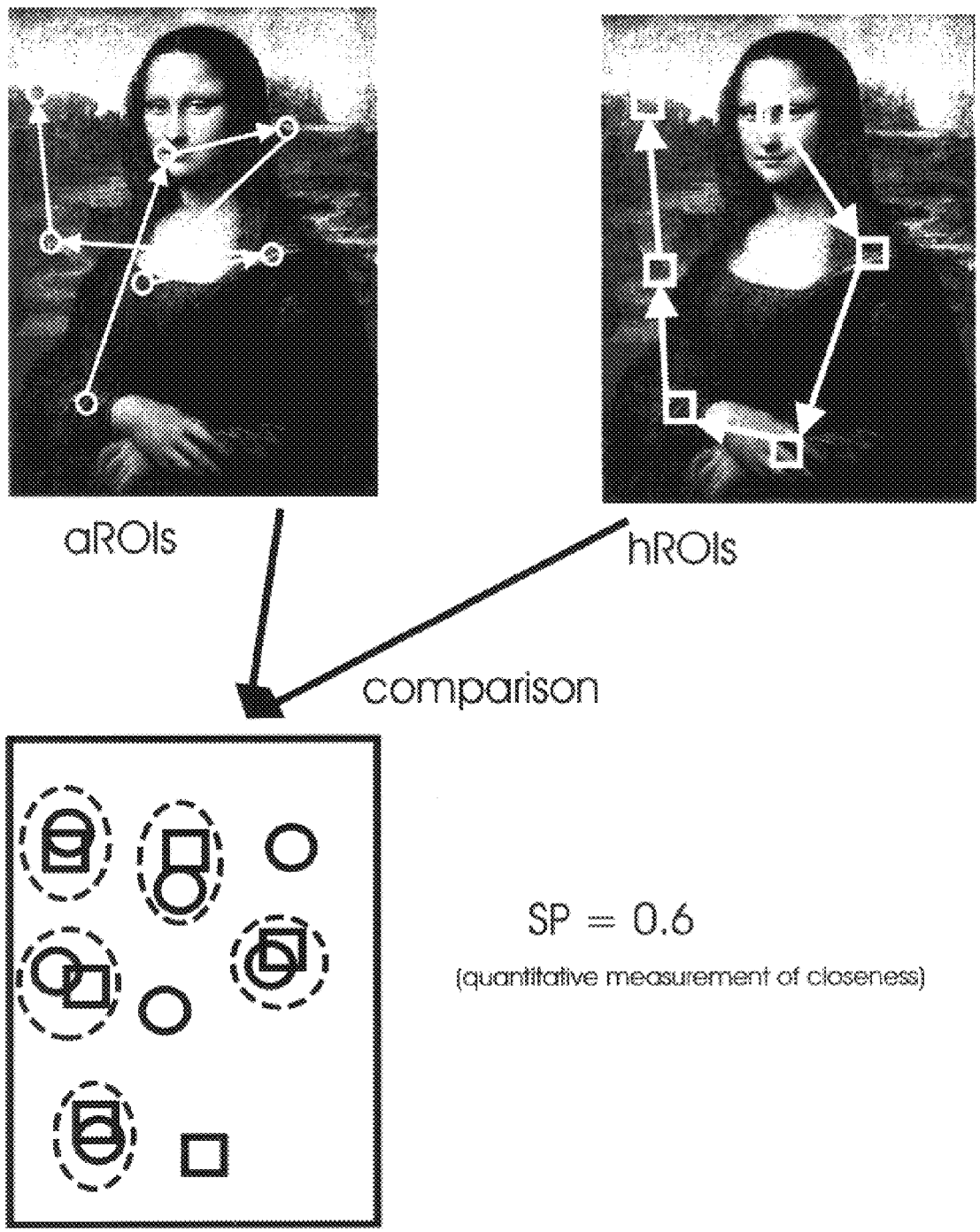
FIG. 10 shows how algorithmic regions of interest (aROIs) may be compared to human visual regions of interest (hROIs) to obtain a quantitative measurement between the various regions of interest.

Turning now to FIG. 10, in one particularly innovative aspect, the present invention provides for a correlation of algorithmic regions of interest (aROIs) and human visual regions of interest (hROIs), such that transformation algorithms to be applied to particular types of images or collections of images may be selected based upon a predetermined correlation between aROIs and hROIs for a particular type of image or collection of images to be processed. Thus, in accordance with one form of the present invention it is possible to store data reflecting an internal cognitive model, or correspondence between aROIs and hROIs, for particular types of images within an image processing system. The internal cognitive model data (i.e., aROI and hROI correlation data) may then be used to select appropriate image processing transformation functions for utilization in processing image data such that any algorithmically determined regions of interest (aROIs) may have a high, or relatively high, likelihood of corresponding to a set of human visual regions of interest (hROIs) within the images or collection (s) of images being processed.

A table showing a correlation between algorithmic regions of interest (aROIs) identified by four exemplary transformation functions and human visual regions of interest (hROIs) developed through monitoring the eye movements of four human subjects is provided in FIG. 11.

Correlations of the type described above may be established as follows. ROI loci selected by different image processing algorithms and those defined by human eye movement fixations are first compared. Further, any comparison of aROIs to hROIs preferably proceeds by obtaining two sets of ROIs, one aROI and one hROI, and clustering the two sets of ROIs using a distance measure derived from a k-means pre-evaluation. This evaluation preferably determines regions defining coincidence and non-coincidence based upon distances between the respective loci of the two sets of ROIs. The final selection of joined-ROIs then enables the calculation of a similarity metric, $S_p$, to determine how close the two sets of ROIs were.

Thus, in a preferred form, an index of similarity may be utilized to describe how closely two sets of ROIs resemble one another. For additional discussion of methods of correlating ROIs, reference is made to Privitera and Stark, "Algorithms for Defining Visual Region-of-Interest: Comparison with Eye Fixations," Memorandum No. UCB/ERL M97/72, Electronics Research Laboratory, College of Engineering, University of California, Berkeley, which is hereby incorporated by reference.

Turning now to FIGS. 12a–d, it can be seen how algorithmic regions of interest (aROIs) having a high correlation with anticipated human visual regions of interest (hROIs) may be used to enhance the performance of various data compression techniques. For example, it will be appreciated that an original image 60 is provided in FIG. 12a, and that algorithmic regions of interest (aROIs) 62a–g having a relatively high correlation with predetermined human visual regions of interest (hROIs) for the original image 60 are shown in FIG. 12c. It also can be seen that, when the selected algorithmic regions of interest (aROIs) 62a–g are incorporated into a compressed image 64 such as that shown in FIG. 12d, substantial improvements in compressed image quality may be achieved over conventional compressed images, such as the compressed image 66 shown in FIG. 12b.

A region-of-visual-interest image processing (ROVIIP) system in accordance with a presently preferred form of the present invention preferably performs six basic functions or processes. These include image transformation and thresholding, transformed image clustering, human visual region of interest (hROI) identification and/or storage, similarity index generation, optimal transformation algorithm selection, and optimal transformation algorithm utilization.

Step 1: Image Transformation and Thresholding

As explained above, the first step generally performed by a region-of-visual-interest image processing (ROVIIP) system generally requires the transformation of a sample image from a collection of images to be processed. Transformations of the sample image(s) are performed using a plurality of image transformation functions stored within a database. These transformations yield a respective plurality of transformed images, and a thresholding function is preferably applied to the transformed images to identify respective sets of local maxima within the transformed images. Preferably sets of approximately 100 local maxima are identified for each transformed image.

Step 2: Transformed Image Clustering

Following the basic transformation and thresholding step, clustering algorithms preferably are applied iteratively to the respective sets of local maxima to identify respective smaller sets of relevant loci. The smaller sets of relevant loci preferably number 10 or less and are referred to herein as algorithmic regions of interest (aROIs).

Step 3: Human Visual Region of Interest Identification and/or Storage

Preferably, human visual regions of interest (hROIs) are predetermined for the type of image or collection(s) of images to be processed. In the event that hROIs are not predetermined for the type of image or collection(s) of images to be processed, the eye movements of several subjects, when presented with the above-referenced sample image, may be observed, monitored and quantified to develop a set of hROIs for the type of image or collection(s) of images to be processed.

Step 4: Similarity Index Generation

Once the sets of aROIs and hROIs have been developed for the sample image, or a set of sample images, a similarity index between the two types of ROI data may be developed and utilized to provide a correlation between the sets of aROIs and hROIs developed for the sample image.

Step 5: Optimal Transformation Algorithm Selection

Using the similarity index or correlation data, it is possible to select an optimal image transformation function, or optimal group of functions, from the database of available image transformation functions. The selected optimal image transformation function may be referred to, for example, as A*, and may correspond to the image transformation function that yields aROIs for the sample image(s) that show the greatest similarity to the predetermined hROIs.

Step 6: Optimal Transformation Algorithm Utilization

Once an optimal image transformation function, A*, has been selected, that image transformation function may be utilized to process the remainder of images within the collection or collections of images, thus insuring that the overall image processing function proceeds in an intelligent manner. The manner is deemed to be "intelligent" because the optimal image processing algorithm, A*, has been selected to have a high, or relatively, high correlation with human image processing and yet can process large collections of image data autonomously.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A method for processing image data, said method comprising the steps of:

establishing for at least one image type a correlation between a plurality of algorithmic regions of interest developed by a respective plurality of transformation algorithms and at least one set of human visual regions of interest, wherein the one set of human visual regions of interest comprises a plurality of human fixation loci, the locations of said loci being determined by monitoring the amount of time that a human eye focuses on a particular loci;

selecting a transformation algorithm for processing data representative of an image based upon an image type and said correlation; and transforming said image data from a first domain to a second domain using said selected transformation algorithm.

2. The method of claim 1, wherein the plurality of transformation algorithms comprises a Michaelson contrast.

3. The method of claim 1, wherein the plurality of algorithms comprises a discrete cosine transform.

4. The method of claim 1, wherein the plurality of algorithms comprises a discrete wavelet transform.

5. A method for selecting image transformation functions for image processing applications, said method comprising the steps of:

storing within a memory at least one data set descriptive of human visual regions of interest for at least one type of image, wherein said data set comprises a plurality of human fixation loci, the locations of said loci being determined by monitoring the amount of time that a human eye focuses on a particular loci;

applying a plurality of image transformation functions to an image corresponding to said at least one type of image to derive a plurality of respective data sets comprising local maxima;

applying clustering functions to said plurality of respective data sets comprising said local maxima to derive a plurality of respective data sets comprising algorithmic regions of interest within said image; and comparing said respective data sets comprising said algorithmic regions of interest to said at least one data set descriptive of said human visual regions of interest to select a transformation function for processing additional images corresponding to said at least one type of image.

6. The method of claim 5, wherein the plurality of image transformation functions comprises a Michaelson contrast.

7. The method of claim 5, wherein the plurality of image transformation functions comprises a discrete cosine transform.

8. The method of claim 5, wherein the plurality of image transformation functions comprises a discrete wavelet transform.

* * * * *